US009262796B2

(12) United States Patent
Nagata

(10) Patent No.: US 9,262,796 B2
(45) Date of Patent: Feb. 16, 2016

(54) COMMUNICATION APPARATUS

(71) Applicant: FUJITSU TEN LIMITED, Kobe-shi, Hyogo (JP)

(72) Inventor: Yuu Nagata, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 249 days.

(21) Appl. No.: 14/177,676

(22) Filed: Feb. 11, 2014

(65) Prior Publication Data
US 2014/0236601 A1 Aug. 21, 2014

(30) Foreign Application Priority Data

Feb. 21, 2013 (JP) .................................. 2013-032057

(51) Int. Cl.
G06T 1/20 (2006.01)
G10L 21/02 (2013.01)
(52) U.S. Cl.
CPC ........................................ G06T 1/20 (2013.01)
(58) Field of Classification Search
CPC ...... G06T 1/20; G06T 21/02; G06T 2021/105
See application file for complete search history.

(56) References Cited

U.S. PATENT DOCUMENTS 6,249,720 B1 * 6/2001 Kubota ............... B60R 16/0232
340/990
2006/0129637 A1 * 6/2006 Yoshida .................... G06F 3/16
709/203

FOREIGN PATENT DOCUMENTS

JP A-2001-201352 7/2001
JP A-2006-084184 3/2006
JP A-2006-154926 6/2006

* cited by examiner

Primary Examiner — King Poon
Assistant Examiner — Ibrahim Siddo
(74) Attorney, Agent, or Firm — Oliff PLC

(57) ABSTRACT

In an agent function, when a character image in motion is displayed, a number of the character images to be displayed is changed, depending on whether or not a speech utterance of a user is being received. In other words, during receipt the speech utterance of the user, the communication apparatus sends the character images to the vehicle-mounted apparatus at a first reduced frequency. Thus, even when a process of receiving the speech utterance and a process of displaying the character images are concurrently performed, the vehicle-mounted apparatus is not overloaded with the processes. Therefore, a stopping state of a process caused by overload of the vehicle-mounted apparatus with processes can be prevented and stoppage of the motion of the character image can also be prevented even during the receipt of the speech utterance.

14 Claims, 11 Drawing Sheets

COMMUNICATION APPARATUS

BACKGROUND OF THE INVENTION

1. Field of the Invention

The invention relates to a technology for a process that uses a recognition result of a speech utterance of a user.

2. Description of the Background Art

Conventionally, a function designed to allow a user to more smoothly operate a device through a conversation with a character (a so-called agent function) is well known. For example, when the user says "restaurant" in response to a question about a destination asked by a character displayed on a screen of a car navigation device, the technology narrows down and sets a restaurant located near as a designation of the route guidance. By using such an agent function, the user can operate the device or can search information more easily through the conversation with the character. For smooth communication between the user and the character in the agent function, it is recommended that a process of displaying a character image in motion and a process of asking various questions should be continuously performed.

However, if the character image is continuously displayed, there is a case where the process of displaying the image and a process of receiving the speech utterance of the user are concurrently performed. In this case, there is a possibility that the process is stopped (a so-called freeze state) because the device is overloaded and thus the motion of the character in the image may be stopped during receipt of the speech utterance. When the motion of the character in the image is stopped, the smooth communication between the user and the character is disrupted. As a result, the agent function designed for an easy operation of the device through a conversation with the character may not fully produce an effect.

SUMMARY OF THE INVENTION

According to one aspect of the invention, a communication apparatus that communicates with a vehicle-mounted apparatus includes: a generator that generates a character image that has a conversation with a user; a sender that sends the character image for display on a vehicle-mounted apparatus at a first predetermined frequency; and a receiver that receives from the vehicle-mounted apparatus a speech utterance of the user during the conversation with the character image displayed on the vehicle-mounted apparatus. The sender sends the character image at a first reduced frequency during receipt of the speech utterance of the user as compared to during periods of nonreceipt of the speech utterance.

Since the sender sends the character image at the first reduced frequency during the receipt of the speech utterance of the user as compared to during the periods of nonreceipt of the speech utterance, even when a process of sending the character image and a process of receiving the speech utterance are concurrently performed, the character image can be continuously displayed on the vehicle-mounted apparatus while the process of receiving the speech utterance is being performed.

According to another aspect of the invention, a communication apparatus that communicates with a vehicle-mounted apparatus includes: a generator that generates a character image that has a conversation with a user; a sender that sends the character image for display on the vehicle-mounted apparatus at a first predetermined frequency; and a receiver that receives from the vehicle-mounted apparatus a speech utterance of the user during the conversation with the character image displayed on the vehicle-mounted apparatus. The sender sends the character image at a first reduced frequency during receipt of the speech utterance of the user as compared to during periods of nonreceipt of the speech utterance. The generator generates the character image at a second predetermined frequency and generates the character image at a second reduced frequency during the receipt of the speech utterance of the user as compared to during the periods of nonreceipt of the speech utterance.

Since the sender sends the character image at the first reduced frequency during the receipt of the speech utterance of the user as compared to during the periods of nonreceipt of the speech utterance, even when a process of sending the character image and a process of receiving the speech utterance are concurrently performed, the character image can be continuously displayed on the vehicle-mounted apparatus while the process of receiving the speech utterance.

Therefore, an object of the invention is to provide a technology that causes an agent function to produce an effect without stopping a motion of a character image even during receipt of a speech utterance of a user.

These and other objects, features, aspects and advantages of the invention will become more apparent from the following detailed description of the invention when taken in conjunction with the accompanying drawings.

DESCRIPTION OF THE EMBODIMENTS

An embodiment of the invention is hereinafter explained with reference to the drawings.

1. First Embodiment

<1-1. Outline>
<1. Outline of Speech Processing System>

Figure 1:
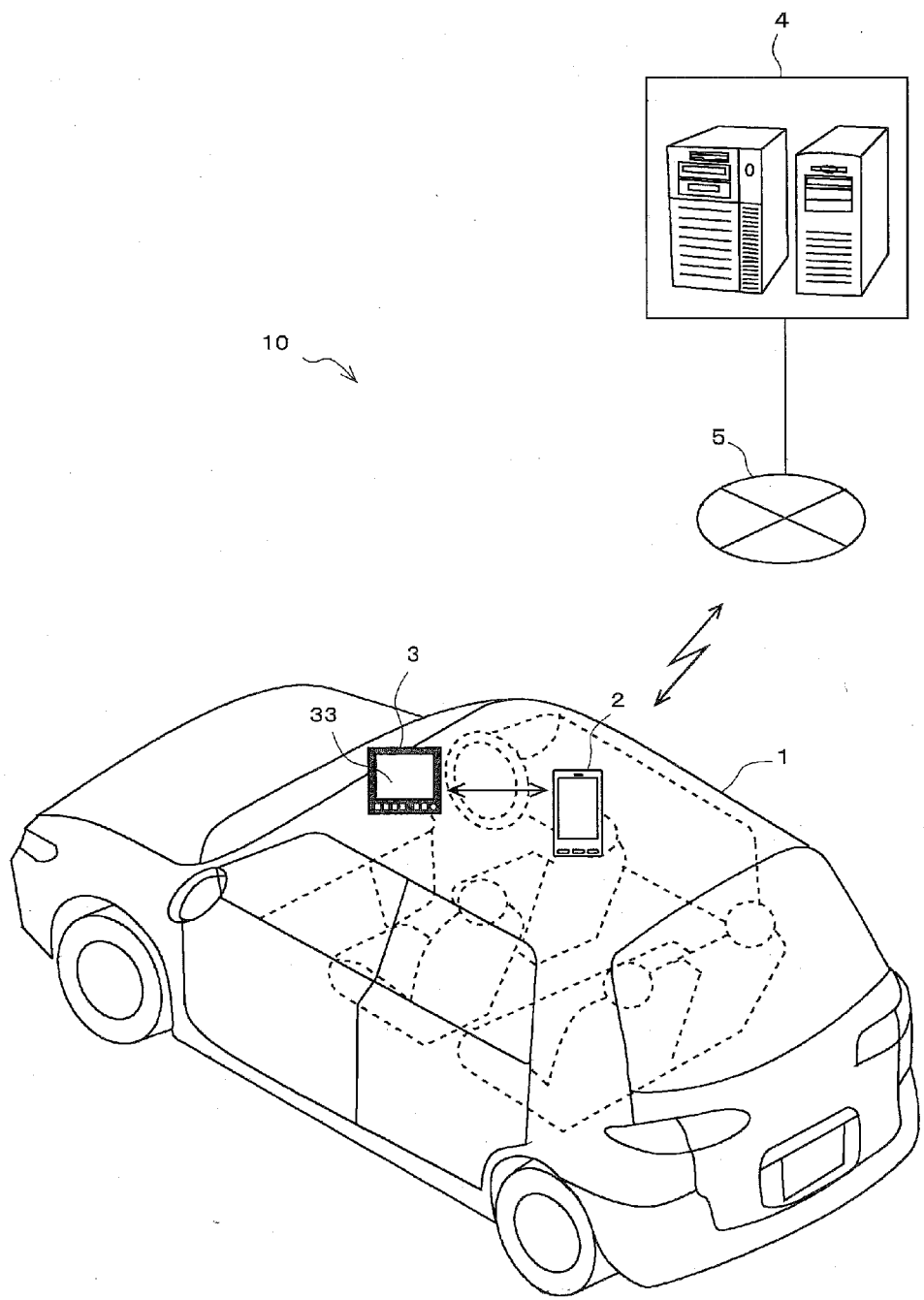
FIG. 1 shows an outline of a communication system.

FIG. 1 shows an outline of a communication system 10 of this embodiment. The communication system 10 includes a communication apparatus 2 that is brought into a vehicle 1, a vehicle-mounted apparatus 3 that is mounted on the vehicle 1 and a server 4 that is disposed outside the vehicle 1.

The vehicle-mounted apparatus 3 includes a navigation function that provides route guidance to a destination and an audio function that plays music.

The server 4 sends and receives data to/from the communication apparatus 2, via a network 5, such as an Internet network.

The communication system 10 displays an image of a character, such as a person, on a display of the vehicle-mounted apparatus 3. A user can cause the vehicle-mounted apparatus 3 to perform an intended operation through a conversation with the displayed character. The communication system 10 includes a so-called agent function that allows a user to operate a device through a conversation with a character.

The agent function performs a speech recognition process of a speech utterance spoken by the user (typically a driver) of the vehicle 1 and operates in accordance with a result of the speech recognition process. The user of the vehicle 1 can operate the vehicle-mounted apparatus 3 and can search information by speaking various utterances.

Specific information generated by the server 4 is sent (provided) to the vehicle-mounted apparatus 3 via the communication apparatus 2, and then the information is displayed on the vehicle-mounted apparatus 3. Among the information are weather information and traffic information. The user can see updates of the information in the vehicle 1.

Figure 2:
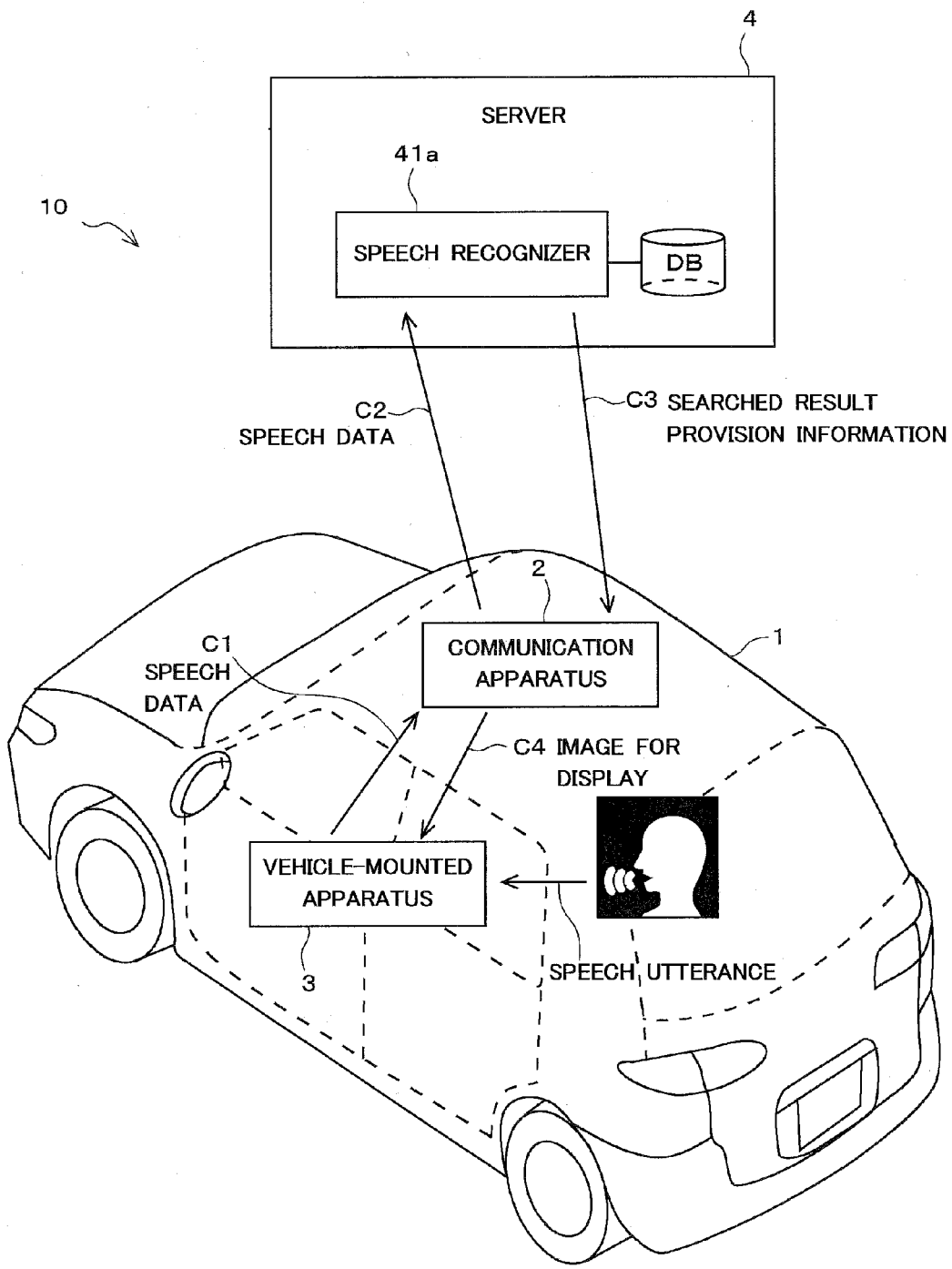
FIG. 2 shows an outline of an agent function.

FIG. 2 shows an outline of the agent function performed by the communication system 10. As shown in FIG. 2, the server 4 includes a speech recognizer 41a that recognizes the speech utterance of the user and that interprets meaning of the speech utterance.

Once the agent function is executed, the vehicle-mounted apparatus 3 obtains the speech utterance of the user and sends speech data representing the obtained speech utterance to the communication apparatus 2 (an arrow C1). The communication apparatus 2 sends the received speech data to the server 4 (an arrow C2). The speech recognizer 41a of the server 4 performs the speech recognition process of the received speech data and converts the speech data to text data representing the speech utterance of the user. The speech recognizer 41a searches database, for example, for a facility fitting a meaning of the text data that is a recognition result of the speech recognition process and sends a searched result to the communication apparatus 2 (an arrow C3). The communication apparatus 2 receives the searched result, such as a facility, from the server 4, as a processed result of the speech recognition process performed by the speech recognizer 41a. The communication apparatus 2 generates an image showing a list of the searched results based on the received processed result. For example, when the user speaks "nearby restaurant," the communication apparatus 2 receives from the server 4 the list of the searched results of restaurants located near the vehicle 1, and generates the image showing the list of the searched results. The communication apparatus 2 sends the generated image to the vehicle-mounted apparatus 3 (an arrow C4). By selecting one item from the list of the searched results displayed on the display of the vehicle-mounted apparatus 3, for example, the user can set the selected restaurant as a destination of the navigation function.

A variety of information generated by the server 4 is sent to the vehicle-mounted apparatus 3 via the communication apparatus 2 (the arrow C3). The communication apparatus 2 generates an image which shows the information, and sends the image to the vehicle-mounted apparatus 3 (the arrow C4). Thus, the information is displayed on the vehicle-mounted apparatus 3, and the user can see updates of weather information, traffic information and others in the vehicle 1.

Through working with the server 4, the communication apparatus 2 and the vehicle-mounted apparatus 3 operate in accordance with the speech utterance of the user of the vehicle 1 and/or execute the agent function that offers information. A process of "displaying" an image in this embodiment refers to not only a process of displaying an image on the display but also a process of generating the image and a process of sending the generated image.

Figure 3:
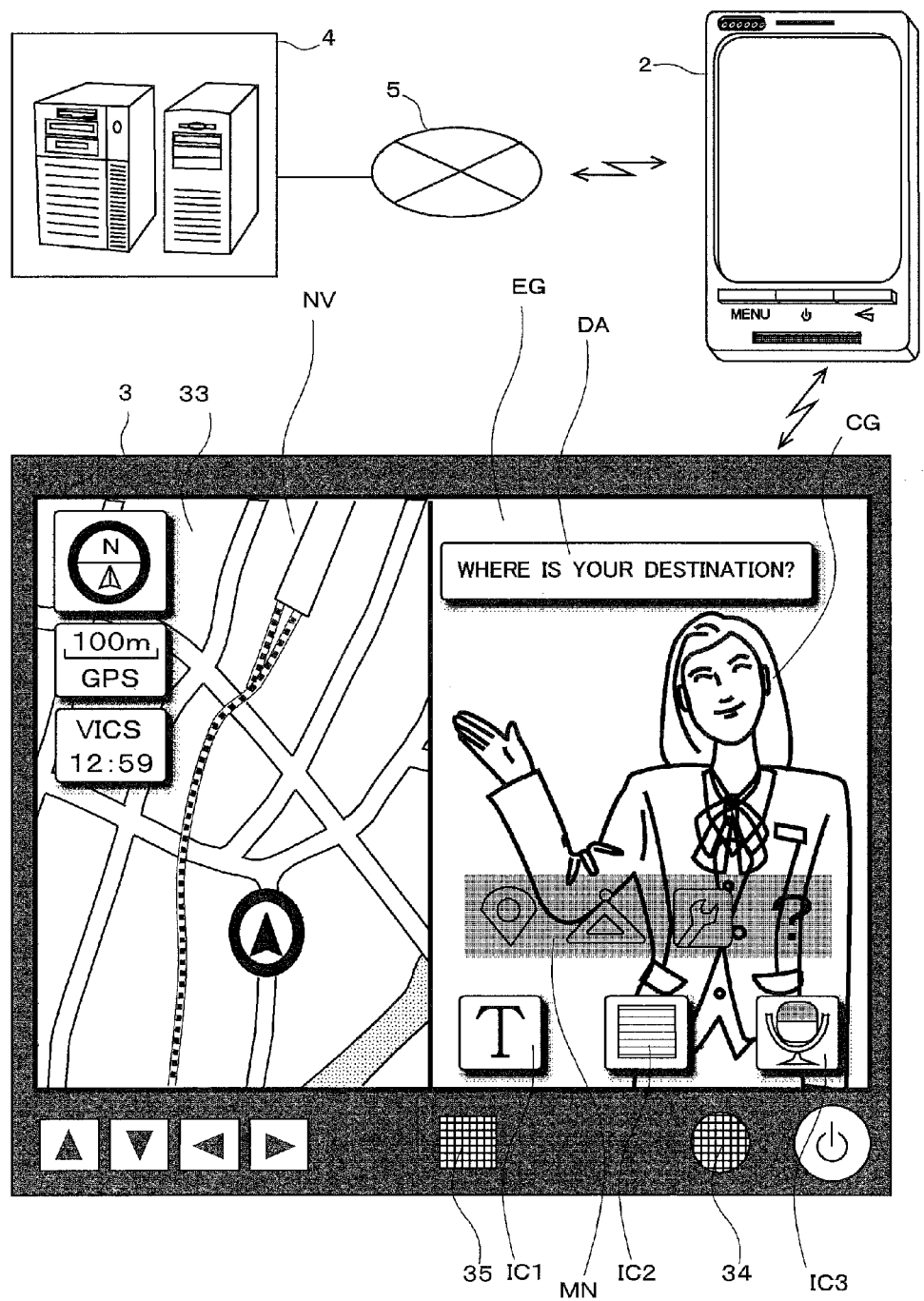
FIG. 3 shows an example of an image displayed on a display.

FIG. 3 shows an example of the vehicle-mounted apparatus 3. The vehicle-mounted apparatus 3 includes a display 33 as a display apparatus to display a variety of information. The display 33 includes a touch panel function and receives a touch operation of the user. The display 33 displays a navigation image NV on a left half of the display 33, and displays an agent image EG on a right half of the display 33. The navigation image NV is generated by the vehicle-mounted apparatus 3 and is displayed on the display 33. The agent image EG is sent from the communication apparatus 2 and is displayed on the display 33.

The agent image EG includes a character image CG, a menu image MN that is used for an operation, and icons IC1, IC2 and IC3. It is recommended that the character image CG should be an image of a person because the character image CG has a conversation with the user. However, the character image CG may be an anthropomorphic animal or an anthropomorphic thing. Any image may be used as the character image CG as long as the image is appropriate to communicate with the user.

The vehicle-mounted apparatus 3 includes a speaker 34 and a microphone 35 that is used to obtain voice (a speech utterance) of the user. The speaker 34 outputs a question and the like to the user. An example of the question is "Where is your destination?" The microphone 35 works when the microphone icon IC3 is operated by the user not to obtain noise as much as possible.

The user makes an operation with a touch panel or by a speech utterance into the microphone 35 through the conversation with a character, seeing the agent image EG.

Figure 4:
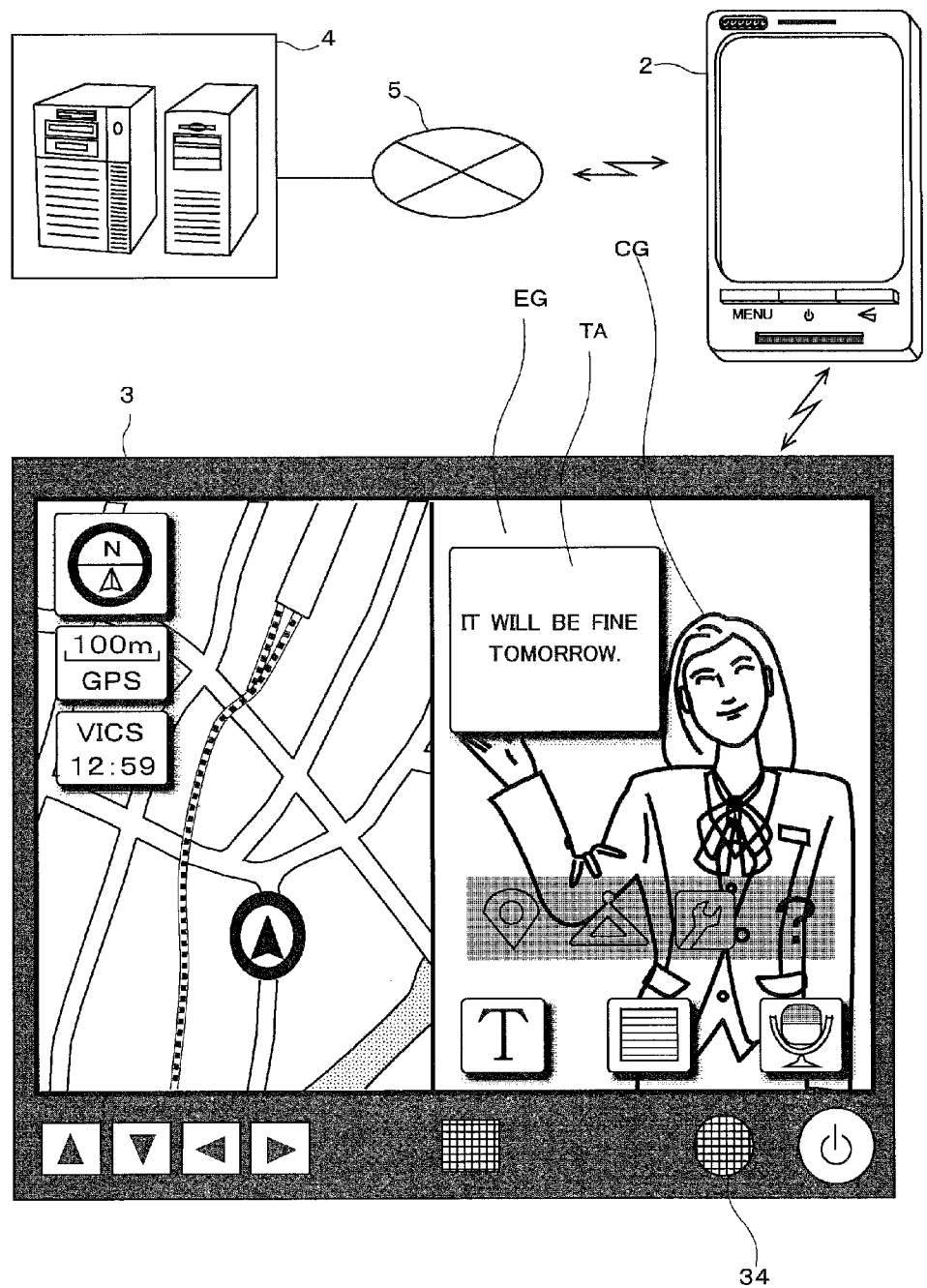
FIG. 4 shows an example of an image displayed on the display.

FIG. 4 shows another example of the vehicle-mounted apparatus 3. The agent function sends the variety of information generated by the server 4 to the vehicle-mounted apparatus 3 via the network 5 and the communication apparatus 2, and the information is displayed on the vehicle-mounted apparatus 3. At a predetermined time interval, at an occurrence of a specific event or in accordance with a prior user setting, the server 4 generates and sends the information. For example, as shown in FIG. 4, weather information TA provided by the server 4 is displayed on the display 33. Moreover, sound is output from the speaker 34. The user can see and listen to updates of the information in the vehicle 1.

The communication system 10 that implements such an agent function is hereinafter explained in detail.

<2. Configurations of Communication Apparatus and Vehicle-Mounted Apparatus>

Figure 5:
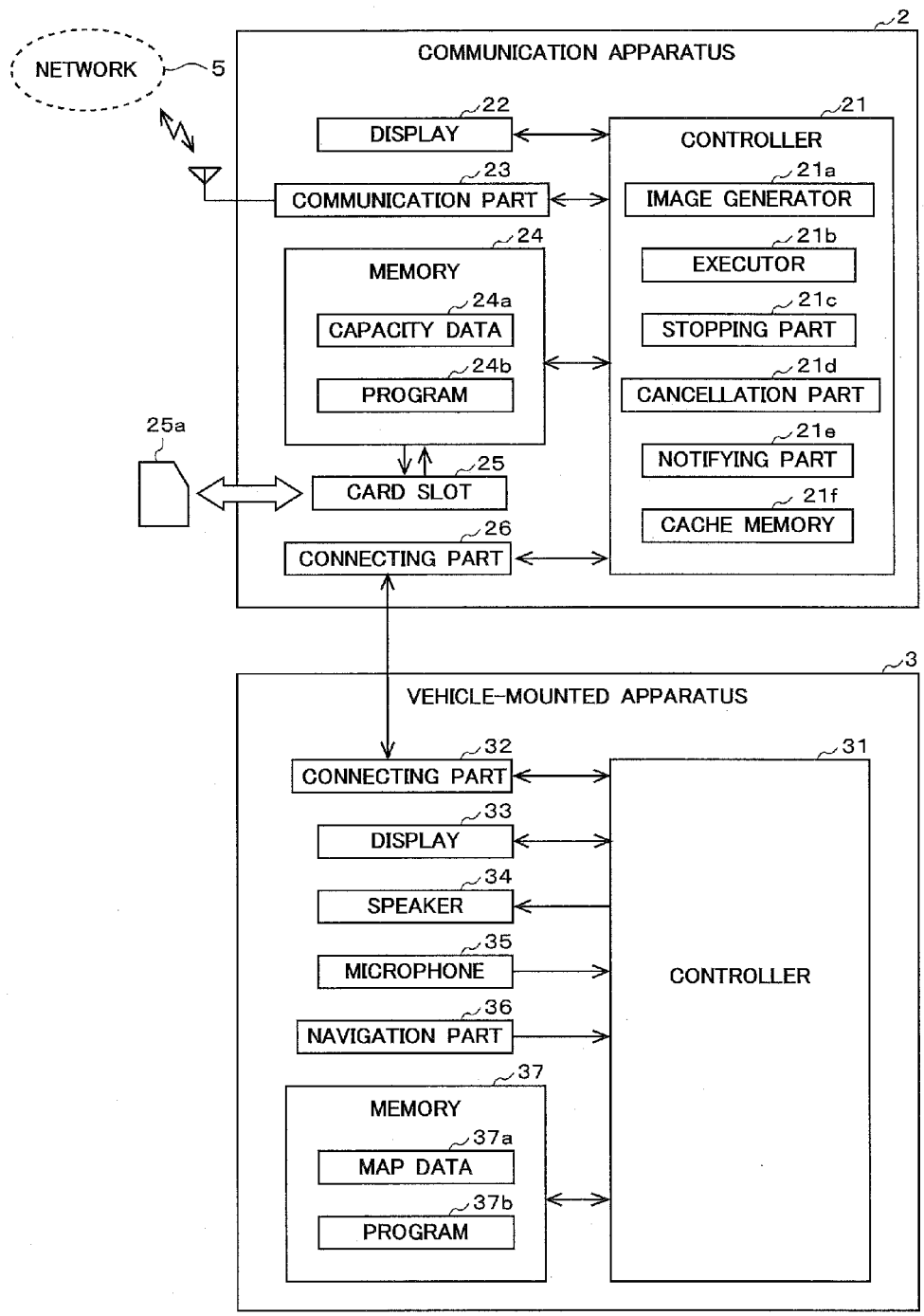
FIG. 5 shows configurations of a communication apparatus and a vehicle-mounted apparatus.

FIG. 5 shows configurations of the communication apparatus 2 and the vehicle-mounted apparatus 3. An upper drawing of FIG. 5 shows the configuration of the communication apparatus 2, and a lower drawing of FIG. 5 shows the configuration of the vehicle-mounted apparatus 3.

The communication apparatus 2 includes a controller 21, a display 22, a communication part 23, a memory 24, a card slot 25, and a connecting part 26.

The controller 21 is a microcomputer that comprehensively controls the whole communication apparatus 2. The controller 21 includes a CPU, a RAM, and a ROM. The CPU includes a cache memory 21f. An operation of each part included in the controller 21 is described later.

The display 22 displays a variety of information, such as a text and a figure, and provides the information to the user. Examples of the display 22 are a liquid crystal display, a plasma display, and an organic EL display, etc. The display 22 includes a touch panel that is used for a user operation made by the user.

The communication part 23 sends and receives data required for the agent function to/from the server 4 via the network 5 in wireless communication. For example, the communication part 23 sends the received speech utterance of the user as the speech data to server 4, and obtains the searched result of the speech recognition process, from the server 4. The communication apparatus 2 that includes the communication part 23 functions as a relay of the data between the vehicle-mounted apparatus 3 and the server 4.

The memory 24 stores a variety of data. For example, the memory 24 is a nonvolatile storage, such as a hard disc drive including an electrically erasable programmable read-only memory (EEPROM), a flash memory, and/or a magnetic disk. The memory 24 stores capacity data 24a and a program 24b.

The capacity data 24a represents a capacity of the communication apparatus 2 to store the data sent from the server 4. The capacity data 24a is a capacity of the cache memory 21f of the CPU included in the controller 21. The capacity data 24a is expressed in a unit of gigabyte (GB), megabyte (MB) and the like.

The program 24b is firmware that is read out and is executed by the controller 21 to control the communication apparatus 2.

The card slot 25 is a slot for a memory card 25a that is a portable storage medium such as a flash memory. The card slot 25 reads out data from the memory card 25a and writes data into the memory card 25a.

The connecting part 26 sends and receives data to/from the vehicle-mounted apparatus 3. The connecting part 26 is connected to the vehicle-mounted apparatus 3 by a cable.

The controller 21 includes various functions implemented by the CPU executing arithmetic processing in accordance with the program 24b stored in the memory 24. An image generator 21a, an executor 21b, a stopping part 21c, a cancellation part 21d and a notifying part 21e shown in FIG. 5 are the functions and hardware of the controller 21, and are implemented by the arithmetic processing in accordance with the program 24b.

The image generator 21a generates, at a predetermined generation frequency, the character image CG that is used for the conversation with the user in the agent function, the menu image MN that is used for an operation, the icon images IC, a message image to the user and the images showing the searched results and the information sent from the server 4. Once generating the image, the image generator 21a takes a screen shot and sends image data of the generated image to the display 22. The image generator 21a generates the character image CG including the character of which a position partially or entirely changes gradually. The image data is sent to the display 22 continuously so that the user can see the character in motion on the display 22. Thus, the effect of the agent function can be improved. For example, during execution of the agent function, the image generator 21a generates 30 character images CG per second. The more the character images CG are generated, the more smoothly the character appears to move. However, as number of images generated in a predetermined time period increases, processing load of the communication apparatus 2 increases.

The executor 21b receives an operation signal that represents the user operation received by the touch panel of the display 22 and also receives the speech data that represents the speech utterance of the user obtained by the microphone 35 described later. The executor 21b performs a process corresponding to the operation signal or the speech data.

The stopping part 21c sends a stop signal to the server 4 to cause the server 4 to stop sending information.

After the server 4 stops sending the information, if the cancellation part 21d sends a cancellation signal to the server 4, stop of sending the information is cancelled.

The notifying part 21e sends the capacity data 24a to the server 4 with reference to the capacity data 24a stored in the memory 24.

The cache memory 21f is a high-speed low-capacity RAM included in the CPU of the controller 21. A controller 41 inputs and outputs the data faster than the memory 24 does by using the cache memory 21f.

The controller 21 controls the connecting part 26 to send the character image CG generated by the image generator 21a to the vehicle-mounted apparatus 3 at a predetermined sending frequency. The controller 21 also functions as a part that displays the sent character image CG on the vehicle-mounted apparatus 3.

The vehicle-mounted apparatus 3 includes a controller 31, a connecting part 32, the display 33, the speaker 34, the microphone 35, a navigation part 36 and a memory 37.

The controller 31 is a microcomputer that comprehensively controls the entire vehicle-mounted apparatus 3. The controller 31 includes a CPU, a RAM, and a ROM. By being electrically connected to the display 33 and the speaker 34, the controller 31 displays the variety of information on the display 33 and outputs a variety of sound from the speaker 34.

The connecting part 32 sends and receives data to/from the communication apparatus 2. The connecting part 32 is connected to the communication apparatus 2 via a cable.

The display 33 is a display apparatus that shows the variety of information, such as a text and a figure, and that provides the information to a driver of the vehicle 1. Among examples of the display 33 are a liquid crystal display, a plasma display, and an organic light emitting display. The display 33 includes a touch panel. The touch panel is used by the user to operate the display 33.

The speaker 34 outputs sound based on the signal from the controller 31, and provides speech information to the driver of the vehicle 1.

The microphone 35 collects the speech utterance spoken by the user. The microphone 35 inputs the collected and obtained speech information to the controller 31. It is recommended that a unidirectional microphone having high sensitivity to sound coming from a front should be used not to collect unnecessary sound such as noise from a street.

The navigation part 36 executes the navigation function that provides a traveling route guidance leading to a destination. Once the destination is set by the user, the navigation part 36 derives a route leading to the destination from a current location of the vehicle 1 obtained by a positioning system, such as GPS, and provides the route guidance to the user. Moreover, the navigation part 36 generates an image of a map of a vicinity of the vehicle 1 based on map data 37a stored in the memory 37. The controller 31 displays the image of the map on the display 33 and the user can see the map during traveling and other time.

The memory 37 is a nonvolatile storage, such as a flash memory, and stores a variety of information. The memory 37 stores a program 37b in addition to the map data 37a used for the navigation function. The map data 37a stores road data and facility data.

The program 37b is firmware that is read out and is executed by the controller 31 to control the vehicle-mounted apparatus 3.

<3. Configuration of Server>

Figure 6:
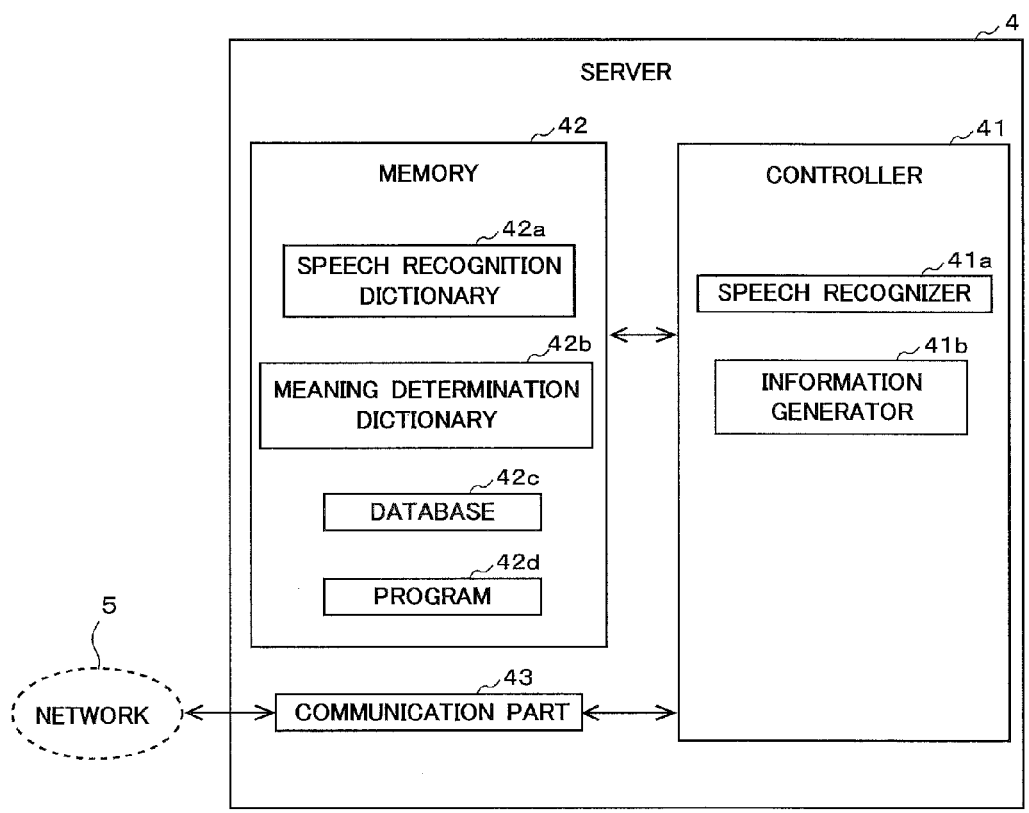
FIG. 6 shows a configuration of a server apparatus.

FIG. 6 shows a configuration of the server 4. The server 4 includes the controller 41, a memory 42, and a communication part 43.

The controller 41 is a computer including a CPU, a RAM and a ROM. Each function of the controller 41 is implemented by the CPU executing an arithmetic processing in accordance with a program 42*d* stored in the memory 42 described later. The controller 41 includes the speech recognizer 41*a* and an information generator 41*b*.

The speech recognizer 41*a* performs the speech recognition process of the speech utterance of the user and generates the text data representing the speech utterance of the user. In other words, the speech recognizer 41*a* converts the speech utterance of the user into the text data based on a feature of the speech utterance of the user, with reference to a speech recognition dictionary 42*a* described later.

The speech recognizer 41*a* deletes an unnecessary word such as a postposition and a conjunction from the text data generated in the speech recognition process and extracts a word. The speech recognizer 41*a* determines a meaning of the speech utterance of the user based on the extracted word and a meaning determination dictionary 42*b* described later. The speech recognizer 41*a* searches database 42*c* for data satisfying a search condition. Examples of the search condition are words relating to distance, e.g. "nearby" and to a category of facilities, e.g. "restaurant." In the search, when information about a location of the vehicle 1 is necessary, the location of the vehicle 1 is obtained from the navigation part 36 of the communication apparatus 2. The speech recognizer 41*a* sends a searched result to the communication apparatus 2 via the communication part 43.

The information generator 41*b* generates information to be provided to the user having the communication apparatus 2 connected to the server 4 via the network 5. Examples of the provided information are weather information, traffic information and information specified by the user beforehand, such as information about a local region and economic information. The information is generated as the text data at the predetermined time interval or at an occurrence of a predetermined event. The information generated by the information generator 41*b* is sent to the communication apparatus 2 via the network 5.

The memory 42 is a nonvolatile storage, such as a hard disc, and stores a variety of information. The memory 42 stores the speech recognition dictionary 42*a*, the meaning determination dictionary 42*b*, the database 42*c* and the program 42*d*.

The speech recognition dictionary 42*a* is a dictionary to which the speech recognizer 41*a* refers to recognize the speech utterance of the user. The speech recognition dictionary 42*a* includes data showing a correspondence relationship between the features of the speech utterance and letters.

The meaning determination dictionary 42*b* is a dictionary to which the speech recognizer 41*a* refers to determine a meaning of the speech utterance of the user. The speech recognition dictionary 42*a* includes data showing a correspondence relationship between words and meanings.

The database 42*c* is database searched by the speech recognizer 41*a*. The database 42*c* includes data of multiple facilities that are possible destinations of the navigation function. The data included in the database 42*c* is updated regularly.

The program 42*d* is firmware that is read out and is executed by the controller 41 to control the server 4.

The communication part 43 connected to the network 5 communicates data with another communication apparatus connectable to the network 5. The communication part 43 sends and receives the data to/from the communication apparatus 2 via the network 5.

<4. Procedure of Agent Function>

Figure 7:
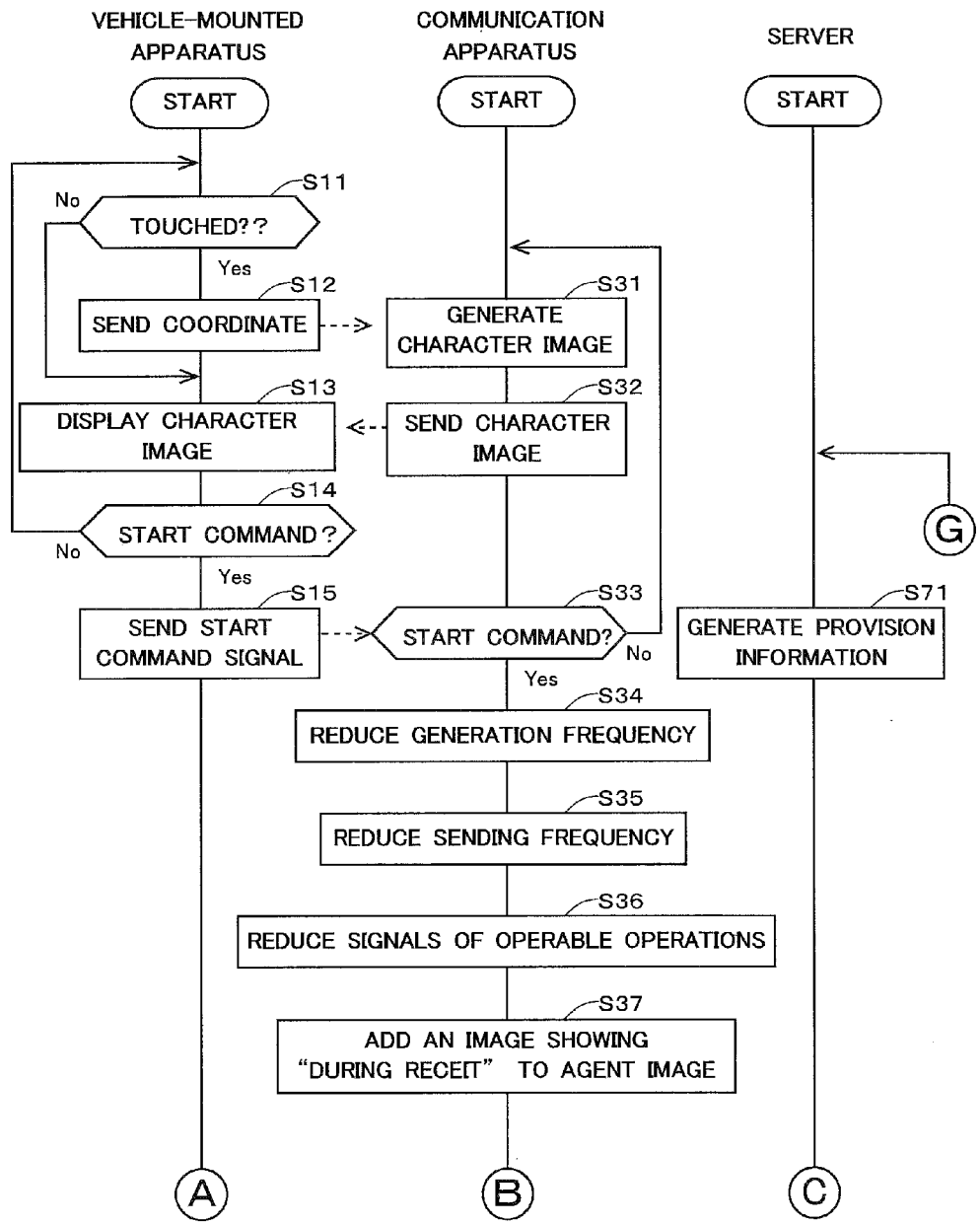
FIG. 7 shows a procedure of the agent function
Figure 8:
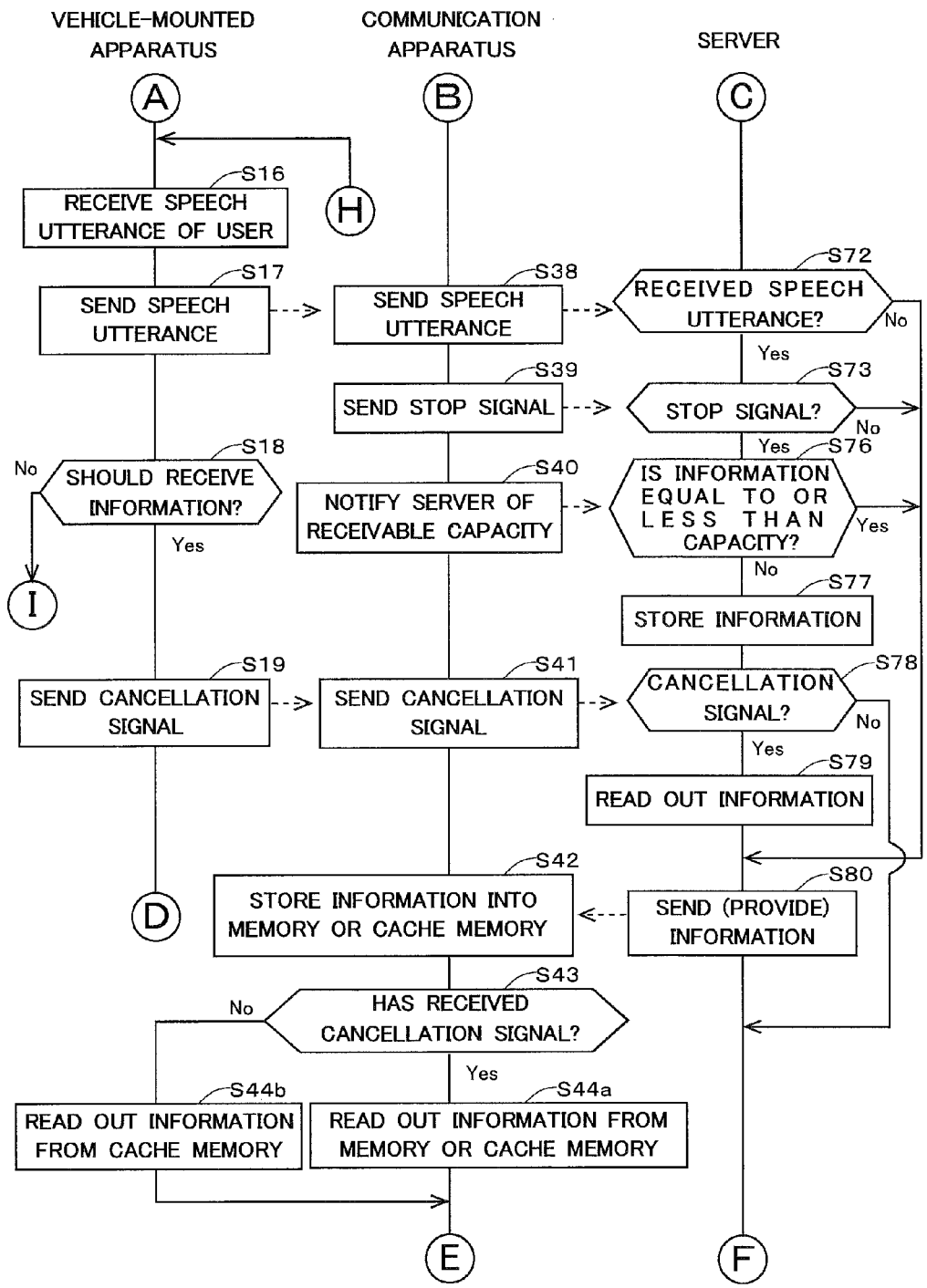
FIG. 8 shows a procedure of the agent function.
Figure 9:
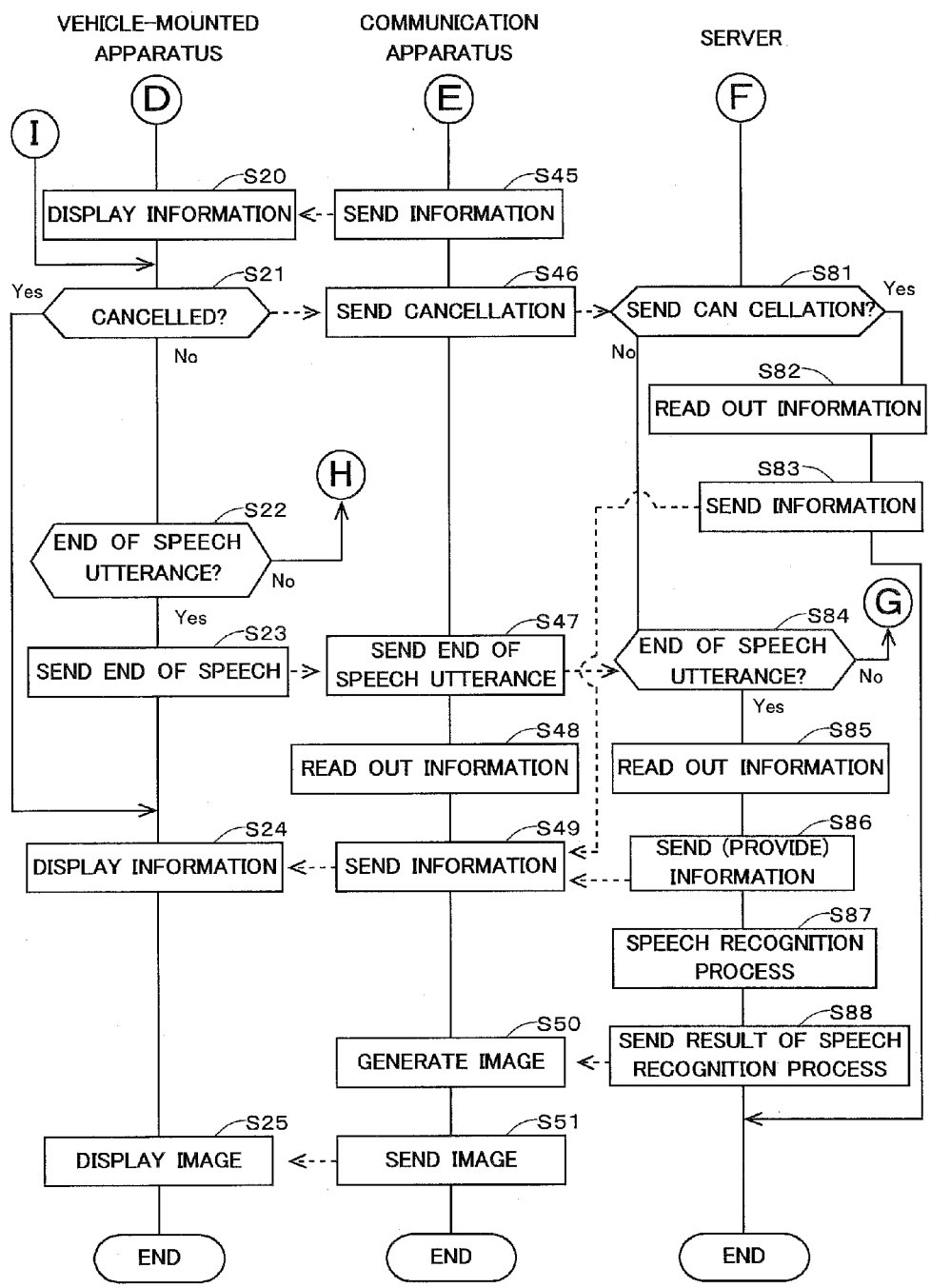
FIG. 9 shows a procedure of the agent function.
Figure 10:
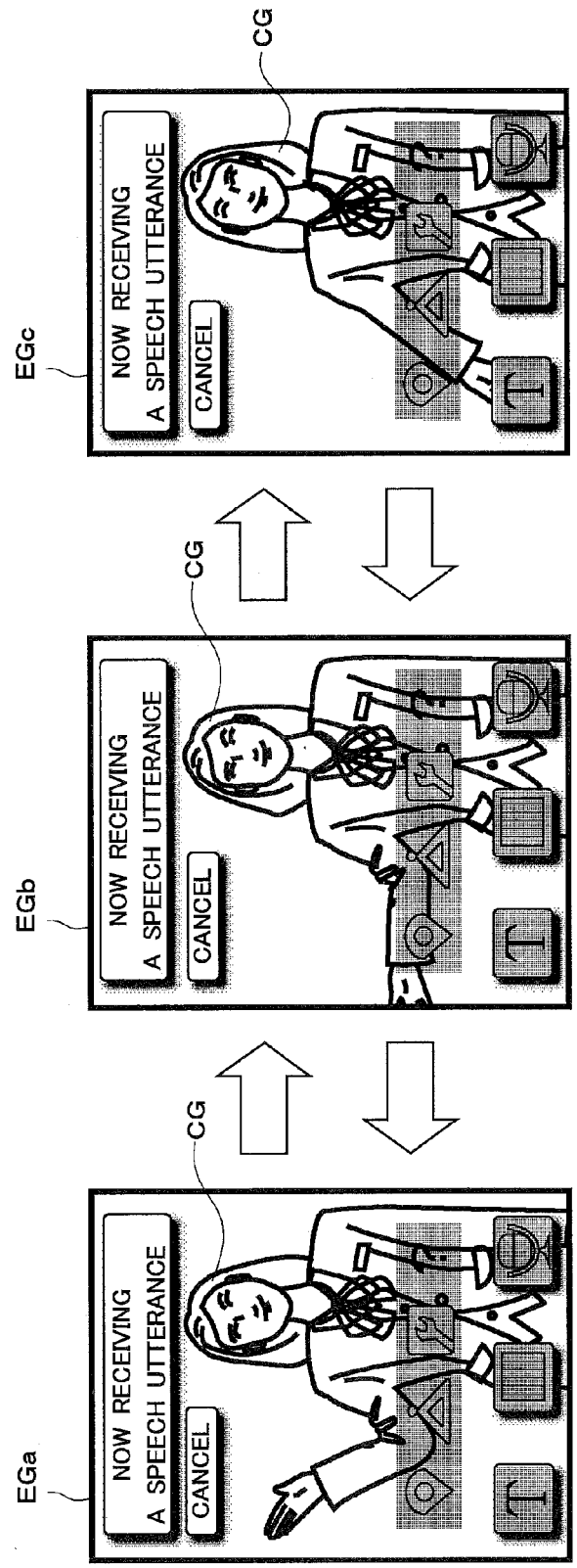
FIG. 10 shows an example of an agent image.
Figure 11:
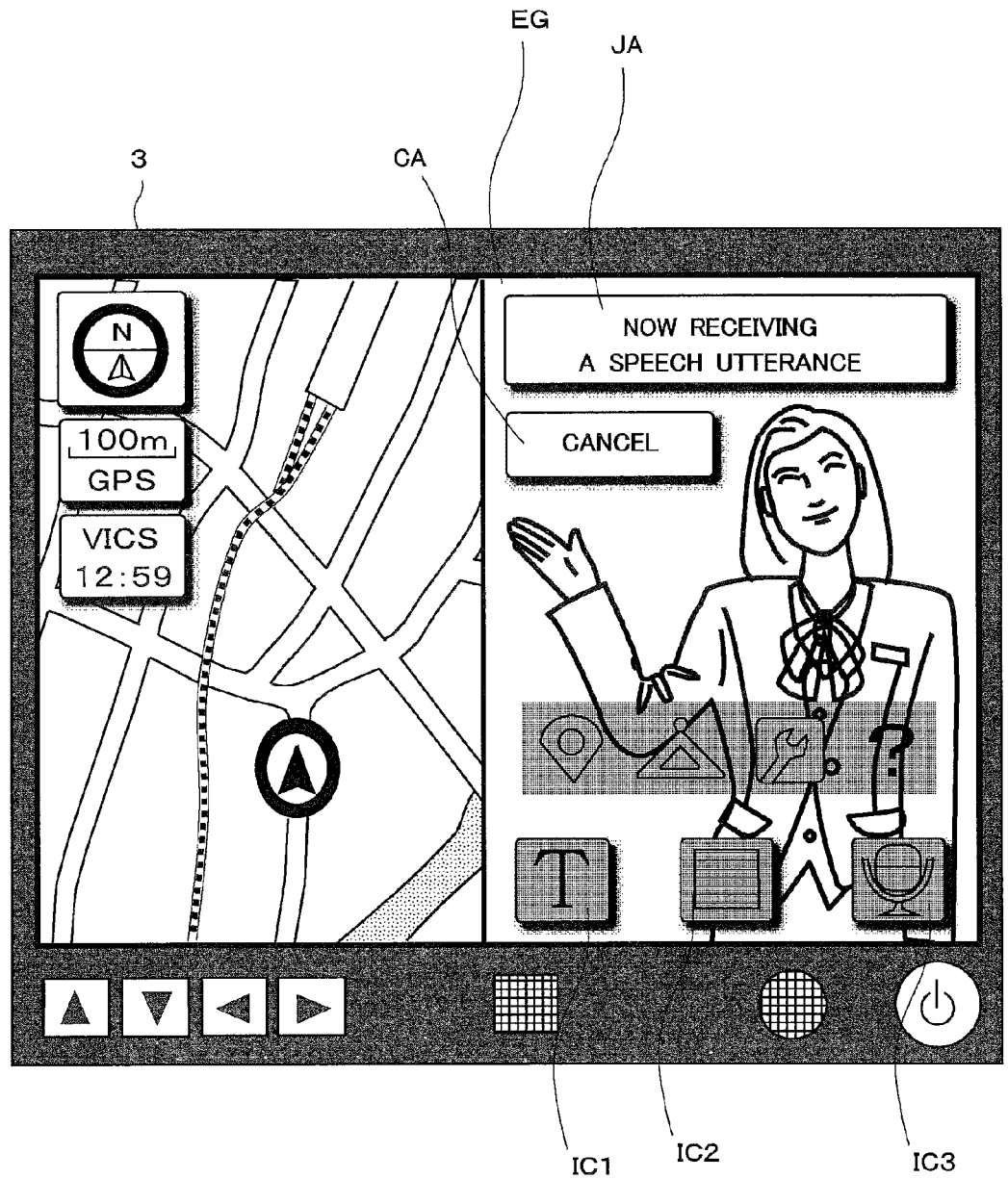
FIG. 11 shows an example of an image displayed on the display.

A procedure performed in the agent function of the communication system 10 is explained with reference to FIG. 7 to FIG. 11. Flowcharts of the procedure performed by the agent function are shown in FIG. 7 to FIG. 9. In the drawings, a left flowchart shows a procedure performed by the vehicle-mounted apparatus 3. A center flowchart shows a procedure performed by the communication apparatus 2, and a right flowchart shows a procedure performed by the server 4. FIG. 10 and FIG. 11 are examples of an image displayed on the display 33 of the vehicle-mounted apparatus 3.

With reference to FIG. 7 to FIG. 9, the procedure performed by the agent function is explained. Before start of the agent function, the controller 31 of the vehicle-mounted apparatus 3 displays the navigation image NV including the map of the vicinity of the vehicle 1 on the display 33. In the state mentioned above, once communications are established between the communication apparatus 2 and the vehicle-mounted apparatus 3 after the connecting part 26 and the connecting part 32 are connected to each other via the cable, the agent function starts to work. The controller 21 of the communication apparatus 2 generates the agent image EG including the character image CG and sends the generated image to the vehicle-mounted apparatus 3. The vehicle-mounted apparatus 3 displays the navigation image NV including the map of the vicinity of the vehicle 1 on the left half of the display 33 and displays the agent image EG including the character image CG on the right half of the display 33.

Once the agent function is started, the controller 31 of the vehicle-mounted apparatus 3 determines whether or not the user has touched the touch panel of the display 33 to make a user intended operation (a step S11). Among the intended operations are an operation to set a function and an operation with an audio apparatus.

When determining that the user has not touched the touch panel (No in the step S11), the controller 31 displays the agent image EG including the character image CG sent from the communication apparatus 2 (a step S13).

When determining that the user has touched the touch panel (Yes in the step S11), the controller 31 sends a signal representing a coordinate of a point touched by the user on the touch panel, to the communication apparatus 2 as an operation signal (a step S12).

The image generator 21*a* of the communication apparatus 2 identifies the user intended operation based on the coordinate included in the operation signal sent by the vehicle-mounted apparatus 3, and generates the character image CG corresponding to the operation (a step S31). For example, the generated character image CG is the image of the character with a gesture and in motion representing that the user operation has been received. In a case of absence of the user operation, the image generator 21*a* generates an image to move the character on the display 33 (the step S31). Therefore, the image generator 21*a* generates plural still images including the character of which position is changed gradually, to generate the character image CG in motion. Number of images generated during periods of nonreceipt of the speech utterance of the user is, for example, 30 images per second. The more the images are generated, the more smoothly the displayed character moves.

The controller 21 of the communication apparatus 2 controls the connecting part 26 to orderly send the generated plural character images CG to the vehicle-mounted apparatus 3 (a step S32). In this case, the controller 21 sends 30 images per second. When the 30 images per second are sent, the user can see the character image CG in smooth motion displayed on the display 33 of the vehicle-mounted apparatus 3.

The controller 31 of the vehicle-mounted apparatus 3 displays the plural character images CG sent from the communication apparatus 2 on the display 33. Since the plural character images CG are orderly displayed on the display 33, the user can see the character images CG making a gesture in motion corresponding to the user operation made with the touch panel and can operate the vehicle-mounted apparatus 3 via communication with the character.

The controller 31 of the vehicle-mounted apparatus 3 determines whether or not the user will make a speech operation (a step S14). In other words, the controller 31 determines whether or not a coordinate of the microphone icon IC3 of the agent image EG has been touched.

When determining that the coordinate has not been touched (No in the step S14), the controller 31 returns to the step S11 and repeats the procedure from the step S11 to the step S14. Moreover, when determining that the coordinate has been touched (Yes in the step S14), the controller 31 sends a start command signal to start the speech operation to the communication apparatus 2 (a step S15).

Once sending the character images CG in the step S32, the controller 21 of the communication apparatus 2 determines whether or not the controller 21 has received the start command signal from the vehicle-mounted apparatus 3 (a step S33). When determining that the controller 21 has not received the start command signal (No in the step S33), the controller 21 generates and sends the character images CG again (the step S31 and the step S32). In this case, the image generator 21a generates and sends 30 character images CG per second. Thus, before a start command of the speech operation, i.e. during the periods of nonreceipt of the speech utterance, the user can see the character images CG in smooth motion on the display 33 of the vehicle-mounted apparatus 3.

When determining that the controller 21 has received the start command signal (Yes in the step S33), the controller 21 performs following four procedures. As a first procedure, the image generator 21a generates the character images CG at a reduced generation frequency (a step S34). For example, the generation frequency of 30 images per second is reduced to the generation frequency of one image per second. FIG. 10 shows an example of the generation frequency and the sending frequency of the character images CG. The image generator 21a generates images EGa, EGb and EGc orderly every second in which motion of the character is changed gradually. After generating the images EGa, EGb and EGc, the image generator 21a may store the three images in the memory 24. In this case, there is no need to generate a new image after generating the images EGa, EGb and EGc. As mentioned above, the character images CG are generated at the reduced generation frequency during receipt of the speech utterance of the user. Therefore, even when the process of generating the images and a process of receiving the speech utterance are concurrently performed, the communication apparatus 2 and the vehicle-mounted apparatus 3 are not overloaded with the processes. Thus, while performing the process of receiving the speech utterance, the character images CG are continuously displayed on the vehicle-mounted apparatus.

As a second process, the controller 21 sends the character images CG at a reduced sending frequency (a step S35). For example, the sending frequency of 30 images per second is reduced to the sending frequency of one image per second. For example, the images EGa, EGb and EGc are sent repeatedly every second in an order shown by arrows in FIG. 10. Since the character images CG are sent orderly of which contents are changed gradually, even if the sending frequency is reduced, the character images CG are displayed in motion on the display 33. As mentioned above, the character images CG are sent at the reduced sending frequency during the receipt of the speech utterance of the user. Therefore, even when the process of sending the images and the process of receiving the speech utterance are concurrently performed, the communication apparatus 2 and the vehicle-mounted apparatus 3 are not overloaded with the processes. Thus, while performing the process of receiving the speech utterance, the character images CG are continuously displayed on the vehicle-mounted apparatus. Moreover, since the sending frequency of the character images CG is reduced once the start command is given by the user, there is no delay in reducing the sending frequency of the character images CG.

As a third process, the controller 21 restricts a user touchable area of the display 33 of the vehicle-mounted apparatus 3 (a step S36). In other words, the controller 21 reduces number of buttons that can be operated by the user with the touch operation. The controller 21 disables buttons for the touch operation by not receiving the operation signals representing coordinates other than a coordinate of a cancel button (described later) that cancels a speech utterance input (does not perform processes corresponding to the coordinates). As mentioned above, the controller 21 receives the operation signals of fewer operations during the receipt of the speech utterance of the user than during the periods of nonreceipt of the speech utterance of the user. Therefore, even if the processing load increases due to the receipt of the speech utterance, the controller 21 does not perform all processes for operations made by the user. Thus, overload of the communication apparatus 2 with the processes can be prevented. It is recommended that the controller 31 of the vehicle-mounted apparatus 3 should tone down colors (so-called grayout) of icons IC1, IC2 and IC3 of disabled buttons displayed on the display 33 for the touch operation. Thus, the user can understand that even if the buttons are touched, the processes corresponding to the buttons are not performed. Moreover, the user can understand that the buttons are not malfunctioning and does not perform an unnecessary operation that is not executed. Otherwise, the disabled buttons may not be displayed.

As a fourth process, the image generator 21a adds to the agent image EG an image showing that the speech utterance is being received (a step S37). FIG. 11 shows an example of the agent image EG added with the image showing that the speech utterance is being received. As shown in FIG. 11, the image generator 21a displays, for example, an image JA showing "Now receiving a speech utterance," along with the character image CG. Thus, if the motion of the character is less smooth because the character images are generated and sent at the reduced generation and sending frequencies, the user can understand that the speech utterance is being received and that the less smooth motion is not malfunctioning. In the fourth process, a cancel button CA is displayed in the agent image EG for "cancellation" of the speech utterance input. As described later, when the user touches the cancel button CA, a coordinate of the touch is sent to the communication apparatus 2 and the speech utterance input is cancelled.

The load applied to the controller 21 of the communication apparatus 2 during the process of generating the image and during the process of sending the image can be reduced by the first process to the fourth process. Therefore, even if the load applied to the controller 21 of the communication apparatus 2 increases during the process of receiving the speech utterance of the user and during the process of sending the image, the communication apparatus 2 is not overloaded with the processes. Moreover, even if the generation frequency and the sending frequency of the character image CG are reduced, the character image CG is displayed on the display 33 in motion. Thus, the effect of the agent function that allows the user to operate the vehicle-mounted apparatus 3 through the conversation is not reduced.

Next, once the user speaks an arbitrary speech utterance, the controller 31 of the vehicle-mounted apparatus 3 receives the speech data output from the microphone 35, and obtains the speech utterance of the user (a step S16). In a case where the controller 31 does not obtain the speech utterance of the user in a predetermine time period (e.g. 10 seconds) after the start command is given because the user does not speak, the controller 31 may display, on the display 33, a message notifying the user of ending the receipt of the speech utterance and may end the process of receiving the speech utterance.

Once obtaining the speech utterance of the user, the controller 31 sends the speech data of the speech utterance via the connecting part 32 to the communication apparatus 2 (a step S17) (the arrow C1 in FIG. 2). Once receiving the speech data from the vehicle-mounted apparatus 3, the communication apparatus 2 sends the speech data to the server 4 (a step S38) (the arrow C2 in FIG. 2).

Once sending the speech utterance of the user to the server 4, the communication apparatus 2 sends to the server 4 the stop signal that causes the server 4 to stop providing information (a step S39). The stop signal is sent by the stopping part 21c of the controller 21 to prevent the processing load from being increased by information provided by the server 4 during the process of receiving the speech utterance.

Moreover, once sending the stop signal to the server 4, the communication apparatus 2 notifies the server 4 of a receivable capacity that is available to receive provision information from the server 4 (a step S40), not to be provided by the server 4 with the information larger than the capacity during the process of receiving the speech utterance. The notifying part 21e of the controller 21 notifies the server 4 of the receivable capacity via the connecting part 26 with reference to the capacity data 24a stored in the memory 24. The capacity data 24a is a capacity of the cache memory 21f of the CPU included in the controller 21. Thus, when notifying the server 4 of the receivable capacity for the provision information, the notifying part 21e refers to the capacity data 24a.

During these processes performed by the communication apparatus 2 and the vehicle-mounted apparatus 3, the provision information is generated by the server 4 under a predetermined condition (a step S71). The server 4 generates the provision information, as described above, for example, at the predetermined time interval or based on a change in a situation, such as weather information and traffic information.

Once generating the provision information, the server 4 determines whether or not the server 4 has received the speech data from the communication apparatus 2 (a step S72).

When determining that the server 4 has not received the speech data (No in the step S72), the server 4 sends the generated provision information to the communication apparatus 2 (a step S80) (the arrow C3 in FIG. 2). When the server 4 has not received the speech data, it is regarded that the communication apparatus 2 is not performing the process of receiving the speech utterance and thus the communication apparatus 2 is not overloaded even if the information is provided.

On the other hand, when determining that the server 4 has received the speech data (Yes in the step S72), the server 4 determines whether or not the stop signal has been sent from the communication apparatus 2 (a step S73).

When determining that the stop signal has not been sent from the communication apparatus 2 (No in the step S73), the server 4 sends the generated provision information to the communication apparatus 2 (a step S80). The stop signal is sent after the user speaks. Therefore, in a case where the stop signal has not been sent, the generated provision information is sent to the communication apparatus 2 because there is no speech utterance input that may increase the processing load of the communication apparatus 2.

On the other hand, when determining that the stop signal has been sent from the communication apparatus 2 (Yes in the step S73), the server 4 determines whether or not the generated provision information is equal to or less than the receivable capacity of the communication apparatus 2 (a step S76). When determining that the generated provision information is equal to or less than the receivable capacity (Yes in the step S76), the server 4 sends the generated provision information to the communication apparatus 2 (the step S80). Thus, when the server 4 has received the stop signal and also when the generated provision information is equal to or less than the receivable data, the server 4 provides the information. Therefore, the communication apparatus 2 is not overloaded with the process of receiving the information. As described above, the receivable data is a storage capacity of the cache memory 21f of the CPU included in the controller 21 of the communication apparatus 2. Information can be written and read out in/from the cache memory 21f at a high speed. Therefore, the communication apparatus 2 is not overloaded with the process.

On the other hand, when determining that the generated provision information is larger than the receivable capacity (No in the step S76), the server 4 stores the generated provision information into the memory 42 (a step S77). The generated provision information stored in the memory 42 is read out and is sent to the communication apparatus 2 later when stop of providing the information is cancelled. In other words, when the provision information is larger than the receivable capacity in volume, the server 4 provides the information after receiving the cancellation signal. Thus, overload of the communication apparatus 2 with the process can be prevented during the receipt of the speech utterance of the user.

In parallel to the processes performed by the communication apparatus 2 and the server 4, the vehicle-mounted apparatus 3 asks the user a question about whether or not the vehicle-mounted apparatus 3 should receive the information (a step S18). The question is answered by the touch operation made by the user with a button displayed on the touch panel of the display 33 of the vehicle-mounted apparatus 3.

When determining that the user has made the touch operation representing an intention to receive the information (Yes in the step S18), the controller 31 of the vehicle-mounted apparatus 3 sends the cancellation signal that cancels the stop of providing the information to the communication apparatus 2 (a step S19). In a case where the stop of providing the information is cancelled, processing load of the vehicle-mounted apparatus 3 may be reduced by temporarily suspending update of the agent image EG because it is regarded that the user places higher priority on receiving the information. On the other hand, when determining that the user has made the touch operation representing an intention not to receive the information (No in the step S18), the controller 31 of the vehicle-mounted apparatus 3 performs the procedure from a step S21 described later.

Once receiving the cancellation signal from the vehicle-mounted apparatus 3, the communication apparatus 2 sends the received cancellation signal to the server 4 (a step S41). The cancellation signal is sent by the cancellation part 21d of the controller 21.

The server 4 determines whether or not the cancellation signal has been sent by the communication apparatus 2 (a step S78). When determining that the cancellation signal has not been sent (No in the step S78), the server 4 moves to a step S81, described later, of the procedure.

On the other hand, when determining that the cancellation signal has been sent (Yes in the step S78), the server 4 reads out the provision information stored in the memory 42 (a step S79) and sends the information to the communication apparatus 2 (a step S80). Since the server 4 provides the information stored in the memory 42 in accordance with the cancellation signal, the communication apparatus 2 can receive the information of which sending has been stopped during the receipt of the speech utterance.

Once the provision information is sent from the server 4, the controller 21 of the communication apparatus 2 stores the provision information into the memory 24 or the cache memory 21$f$ (a step S42). When the sent provision information is larger than the receivable capacity, the controller 21 stores the provision information into the memory 24. When the provision information is equal to or smaller than the receivable capacity, the controller 21 stores the provision information into the cache memory 21$f$. By limiting the information provided by the server 4 to the capacity that can temporarily store the information in the cache memory 21$f$, the communication apparatus 2 is not overloaded with the process of receiving the provided information because the information can be written or read out into/from the cache memory 21$f$ fast.

Next, the controller 21 of the communication apparatus 2 determines whether or not the controller 21 has received the cancellation signal (a step S43). When determining that the controller 21 has received the cancellation signal (Yes in the step S43), the controller 21 reads out the provision information from the memory 24 or the cache memory 21$f$ (a step S44$a$). The image generator 21$a$ generates the image showing the provision information and the controller 21 sends the generated image to the vehicle-mounted apparatus 3 (a step S45) (the arrow C4 in FIG. 2). On the other hand, when determining that the controller 21 has not received the cancellation signal (No in the step S43) and when the provision information is stored in the cache memory 21$f$, the controller 21 reads out the provision information (a step S44$b$) and sends the information to the vehicle-mounted apparatus 3 (the step S45). Even during the process of the speech utterance of the user because the controller 21 has not received the cancellation signal, the communication apparatus 2 is not overloaded with the process because the information can be read out from the cache memory 21$f$ fast.

Once the provision information is sent from the communication apparatus 2, the vehicle-mounted apparatus 3 displays the information on the display 33 (a step S20). As shown in FIG. 4, the agent image EG added with provision information DA is displayed. Thus, the user can see updates of weather information, traffic information, etc. provided by the server 4.

The controller 31 of the vehicle-mounted apparatus 3 determines whether or not the speech utterance input has been cancelled by the user (a step S21) by determining whether or not the user has made the touch operation with the cancel button CA displayed on the touch panel of the display 33.

When determining that the speech utterance input has been cancelled (Yes in the step S21), the controller 31 sends the cancellation signal to the communication apparatus 2. Moreover, when determining that the speech utterance input has not been cancelled (No in the step S21), the controller 31 does not send the cancellation signal and moves to a step S24 described later.

The communication apparatus 2 sends to the server 4 the cancellation signal received from the vehicle-mounted apparatus 3 (a step S46).

Next, the server 4 determines whether or not the cancellation signal has been sent by the communication apparatus 2 (the step S81). When determining that the cancellation signal has been sent (Yes in the step S81), the server 4 reads out the provision information stored in the memory 42 in the step S77 (a step S82). The server 4 sends the read provision information to the communication apparatus 2 (a step S83) (the arrow C3). Since the provision information is sent to the communication apparatus 2 after cancellation of the speech utterance input, the communication apparatus 2 is not overloaded with the process of receiving the provided information.

On the other hand, when determining that the cancellation signal has not been sent (No in the step S81), the server 4 moves to a step S84 described later.

The vehicle-mounted apparatus 3 determines whether or not the speech utterance input has been ended (a step S22), which is a determination process performed in a case where the speech utterance input is not cancelled by the user. A determination about whether or not the speech utterance input has been ended is made based on whether or not a predetermined time period has passed after discontinuation of the speech utterance of the user. The predetermine time period is, for example, 3 seconds.

When determining that the speech utterance input of the user has not been ended (No in the step S22), the vehicle-mounted apparatus 3 returns to the step S16 and continues to receive the speech utterance of the user. Then, the vehicle-mounted apparatus 3 repeats the process from the step S16.

On the other hand, when determining that the speech utterance input of the user has been ended (Yes in the step S22), the vehicle-mounted apparatus 3 sends a speech end signal representing that the speech utterance input has been ended, to the communication apparatus 2 (a step S23).

Once receiving the speech end signal from the vehicle-mounted apparatus 3, the communication apparatus 2 sends the received speech end signal to the server 4 (a step S47).

Based on presence or absence of the speech end signal, the server 4 determines whether or not the speech utterance input of the user has been ended (the step S84). When the server 4 determines that the speech utterance input has not been ended (No in the step S84), the controller 41 of the server 4 returns to the step S71 for generation of the provision information and performs the procedure from the step S71 again.

On the other hand, when the server 4 determines that the speech utterance input has been ended (Yes in the step S84), the controller 41 of the server 4 reads out the provision information stored in the memory 42 in the step S77 (a step S85). The controller 41 sends the read provision information to the communication apparatus 2 (a step S86) (the arrow C3). Since the provision information is sent to the communication apparatus 2 after an end of the speech utterance input, the communication apparatus 2 is not overloaded with the process of the provided information.

Once sending the speech end signal to the server 4 in the step S47, the communication apparatus 2 reads out the provision information from the memory 24 (a step S48). The image generator 21$a$ of the communication apparatus 2 generates the image showing the provision information and sends the generated image to the vehicle-mounted apparatus 3 (a step S49) (the arrow C4 in FIG. 2). Since the information temporarily stored in the memory 24 of the communication apparatus 2 is sent to the vehicle-mounted apparatus 3 after the end of receiving the speech utterance of the user, the communication apparatus 2 is not overloaded with the process of receiving the information and the vehicle-mounted apparatus 3 receives provided information after the end of receiving the speech utterance.

Once the provision information is sent from the server 4 in the step S82 or S86, the communication apparatus 2 sends the image showing the provision information to the vehicle-mounted apparatus 3 (a step S49) (the arrow C4 in FIG. 2).

Once receiving the provision information from the communication apparatus 2, the vehicle-mounted apparatus 3 displays the provision information on the display 33 (a step S24). As shown in FIG. 4, the provision information DA is displayed on the agent image EG. Thus, the user can see updates of weather information, traffic information, etc. provided by the server 4.

The speech recognizer 41a of the server 4 performs, as described below, the speech recognition process that recognizes the received speech utterance of the user (a step S87). First, the speech recognizer 41a extracts a zone including the speech utterance of the user from the speech data. For example, the speech recognizer 41a extracts the zone of signals continuously exceeding a predetermined threshold from the speech data.

Next, with reference to the speech recognition dictionary 42a, the speech recognizer 41a converts the speech utterance of the user into text data based on the feature of the speech utterance of the user. The speech recognizer 41a extracts a word by deleting unnecessary postpositions, conjunctions and the like.

The speech recognizer 41a searches the meaning determination dictionary 42b to find a meaning of the speech utterance of the user, using the extracted word as the search condition. The search condition is, for example, a categorical condition, such as "restaurant," a distance condition, such as "near," and the like. In a case where a location of the vehicle 1 is required for a search, the position of the vehicle 1 may be obtained from the navigation part 36 of the vehicle-mounted apparatus 3. Then, the speech recognizer 41a searches the database for data matching the search condition and sends the searched result to the communication apparatus 2 via the communication part 43 (a step S88) (the arrow C3 in FIG. 3). Once the step S88 is performed, the process of the server 4 is ended.

The communication apparatus 2 receives the searched result of the speech recognition process sent from the server 4, via the communication part 23. The image generator 21a of the communication apparatus 2 generates an image based on the received searched result (a step S50). For example, the agent image EG added with a list of the searched results is generated by the image generator 21a. Moreover, for example, in a case where the list includes facilities, locations of the facilities are shown with icons on the navigation image NV.

Once the image is generated by the image generator 21a based on the searched result, the controller 21 sends the image to the vehicle-mounted apparatus 3 via the connecting part 26 (a step S51) (the arrow C4 in FIG. 2). Once the step S51 is performed, the process performed by the communication apparatus 2 is ended.

Once receiving the image generated based on the search result, the vehicle-mounted apparatus 3 displays the image on the display (a step S25). Once the step S25 is performed, the process performed by the vehicle-mounted apparatus 3 is ended. In a case where the searched results are facilities, when the user selects one facility in the list of the searched results displayed on the image, the navigation part 36 sets the selected facility as a destination in the navigation function. Then, the navigation part 36 provides route guidance leading to the destination.

As described above, in this embodiment, in execution of the agent function that performs a conversation with the user, the character image CG in motion is displayed by displaying still images consecutively and number of the still images to be displayed is changed, depending on receipt or nonreceipt of the speech utterance of the user. In other words, during the receipt of the speech utterance of the user, the communication apparatus 2 reduces the number of the still images to be displayed by reducing a frequency of sending the character images CG to the vehicle-mounted apparatus 3. Thus, even when the process of receiving the speech utterance is performed concurrently with the process of sending the character images CG, the communication apparatus 2 is not overloaded with the processes. Therefore, a stopped state of the process (so-called freeze) caused by overload of the communication apparatus 2 with the processes can be prevented, and thus stop of the motion of the character image CG during the receipt of the speech utterance can be prevented.

<5. Modification>

The embodiment of the invention has been described above. However, the invention is not limited to the aforementioned embodiment and various modifications are possible. Examples of the modifications are hereinafter described. The embodiment described above and the modifications described below may be combined arbitrarily.

In the aforementioned embodiment, the communication apparatus 2 executes the agent function by working with the server 4. However, the communication apparatus 2 may execute the agent function alone. In this case, the communication apparatus 2 may include the speech recognizer 41a. Moreover, the communication apparatus 2 may work alone to execute the agent function besides working with the server 4, and one execution method may be selected, depending on a state of communication with the server 4.

Moreover, in the aforementioned embodiment, the vehicle-mounted apparatus 3 includes a microphone. However, the communication apparatus 2 may include a microphone. In this case, a speech utterance of the user is input from the microphone of the communication apparatus 2 and is sent to the server 4.

Further, in the aforementioned embodiment, the vehicle-mounted apparatus 3 is a device that is mounted on the vehicle 1. However, the vehicle-mounted apparatus 3 may be a portable device, such as a mobile phone and a smartphone, which is not fixedly mounted on the vehicle 1.

In the aforementioned embodiment, the communication apparatus 2 and the vehicle-mounted apparatus 3 are separate apparatuses. However, the communication apparatus 2 and the communication apparatus 2 may be in one unit.

In the aforementioned embodiment, the speech recognizer 41a sends the searched result. However, the speech recognizer 41a may send a command. For example, when the user speaks a speech utterance that means adjustment of volume or selection of music to be played, the server 4 sends a command representing the adjustment of volume or the selection of music to the communication apparatus 2, and the command is executed in the vehicle-mounted apparatus 3.

In the aforementioned embodiment, the communication apparatus 2 and the vehicle-mounted apparatus 3 are connected by a cable. However, the communication apparatus 2 and the vehicle-mounted apparatus 3 may be connected via wireless communication.

In the aforementioned embodiment, a database of the character image CG may be stored in the server 4 and the character or cloth of the character may be changed. By improving an entertainment level, the user may use the agent function, enjoying conversation with a character matching the preference of the user.

In the aforementioned embodiment, the user of the communication apparatus 2 and the vehicle-mounted apparatus 3 is the driver of the vehicle 1. However, a user may be a passenger other than the driver in the vehicle 1.

In the aforementioned embodiment, the speech recognition process is performed in the server 4. However, the process may be performed in the communication apparatus 2. In this case, the server 4 may search database for a facility and the like and may generate the provision information.

In the aforementioned embodiment, the various functions are implemented by software using the CPU executing the arithmetic processing in accordance with the program. However, a part of the functions may be implemented by an electrical hardware circuit.

While the invention has been shown and described in detail, the foregoing description is in all aspects illustrative and not restrictive. It is therefore understood that numerous other modifications and variations can be devised without departing from the scope of the invention.

What is claimed is:

1. A communication apparatus comprising:
   a generator that generates a character image that has a conversation with a user;
   a sender that sends the character image for display on a vehicle-mounted apparatus at a first predetermined frequency; and
   a receiver that receives from the vehicle-mounted apparatus a speech utterance of the user during the conversation with the character image displayed on the vehicle-mounted apparatus, wherein
   the sender sends the character image at a first reduced frequency during receipt of the speech utterance of the user as compared to during periods of nonreceipt of the speech utterance.

2. The communication apparatus according to claim 1, wherein
   the generator generates the character image at a second predetermined frequency during the periods of nonreceipt of the speech utterance, and generates the character image at a second reduced frequency during the receipt of the speech utterance of the user as compared to during the periods of nonreceipt of the speech utterance.

3. The communication apparatus according to claim 1, wherein
   during the receipt of the speech utterance of the user, the generator adds to the character image an image showing that the speech utterance of the user is being received.

4. The communication apparatus according to claim 1, wherein
   the receiver starts the receipt of the speech utterance after a start command is given by the user, and
   once the start command is given, the sender sends the character image at the first reduced frequency.

5. The communication apparatus according to claim 1, further comprising:
   an operation signal receiver that receives an operation signal of an operation made by the user with the vehicle-mounted apparatus; and
   an executor that performs a process corresponding to the operation signal received by the operation signal receiver, wherein
   during the receipt of the speech utterance of the user, the operation signal receiver receives the operation signals of fewer operations than during the periods of nonreceipt of the speech utterance.

6. A communication system comprising a server that provides specific information, and a communication apparatus that sends to a vehicle-mounted apparatus the specific information provided by the server, wherein
   the communication apparatus includes:
   a generator that generates a character image that has a conversation with a user;
   a sender that sends the character image for display on the vehicle-mounted apparatus at a first predetermined frequency; and
   a receiver that receives from the vehicle-mounted apparatus a speech utterance of the user during the conversation with the character image displayed on the vehicle-mounted apparatus, wherein
   the sender sends the character image at a first reduced frequency during receipt of the speech utterance of the user as compared to during periods of nonreceipt of the speech utterance.

7. The communication system according to claim 6, wherein
   the communication apparatus further includes a stopping part that sends a stop signal that causes the server to stop providing the specific information during the receipt of the speech utterance of the user, wherein
   when receiving the stop signal, the server stops providing at least a part of the specific information.

8. The communication system according to claim 7, wherein
   the communication apparatus further includes a cancellation part that sends to the server a cancellation signal that cancels stop of providing the specific information, wherein
   the server further includes a first memory that stores the specific information to be provided to the communication apparatus when the server receives the stop signal and provides the specific information stored in the first memory when the server receives the cancellation signal.

9. The communication system according to claim 7, wherein
   the communication apparatus further includes a notifying part that notifies the server of a receivable capacity that is available to receive the specific information during the receipt of the speech utterance of the user, wherein
   when receiving the stop signal, if the specific information to be provided to the communication apparatus is equal to or smaller than the receivable capacity, the server provides the specific information.

10. The communication system according to claim 9, wherein
    the communication apparatus includes a cache memory, wherein
    the receivable capacity is a capacity that is available to temporarily store the specific information in the cache memory.

11. The communication system according to claim 8, wherein
    the communication apparatus further includes a notifying part that notifies the server of a receivable capacity that is available to receive the specific information during the receipt of the speech utterance of the user, wherein
    when receiving the stop signal,
    if the specific information to be provided to the communication apparatus is equal to or smaller than the receivable capacity, the server provides the specific information and
    if the specific information to be provided to the communication apparatus is larger than the receivable capacity, the server stores the specific information into the first memory.

12. The communication system according to claim 9, wherein the communication apparatus further includes a second memory that temporarily stores the specific information provided by the server during the receipt of the speech utterance of the user, wherein after an end of the receipt of the speech utterance of the user, the sender sends to the vehicle-mounted apparatus the specific information temporarily stored in the second memory.

13. A communication method comprising the steps of:
(a) generating a character image that has a conversation with a user;
(b) sending the character image for display on a vehicle-mounted apparatus at a first predetermined frequency; and
(c) receiving from the vehicle-mounted apparatus a speech utterance of the user during the conversation with the character image displayed on the vehicle-mounted apparatus, wherein the step (b) sends the character image at a first reduced frequency during receipt of the speech utterance of the user as compared to during periods of nonreceipt of the speech utterance.

14. A non-transitory computer-readable storage medium that stores a program for making a computer execute the following processes of:
(a) generating a character image that has a conversation with a user;
(b) sending the character image for display on a vehicle-mounted apparatus at a first predetermined frequency; and
(c) receiving from the vehicle-mounted apparatus a speech utterance of the user during the conversation with the character image displayed on the vehicle-mounted apparatus, wherein the process (b) sends the character image at a first reduced frequency during receipt of the speech utterance of the user as compared to during periods of nonreceipt of the speech utterance.

* * * * *